United States Patent

Bloom et al.

Patent Number: 5,832,070
Date of Patent: Nov. 3, 1998

[54] DEVICE FOR PROGRAMMING SCRIPT SETS IN A TELEPHONE SYSTEM

[75] Inventors: Joseph E. Bloom, Libertyville; Susan A. Palermo, Chicago; Michael C. Auclair, Bolingbrook, all of Ill.

[73] Assignee: Rockwell International Corp., Seal Beach, Calif.

[21] Appl. No.: 775,757

[22] Filed: Dec. 31, 1996

Related U.S. Application Data

[63] Continuation of Ser. No. 523,844, Sep. 5, 1995, abandoned, which is a continuation of Ser. No. 328,979, Oct. 24, 1994, abandoned, which is a continuation of Ser. No. 975,353, Nov. 12, 1992, abandoned.

[51] Int. Cl.[6] .................................................. H04M 3/00
[52] U.S. Cl. ............................................ 379/265; 379/210
[58] Field of Search ..................................... 379/201, 210, 379/213, 214, 220, 221, 265, 266, 308

[56] References Cited

U.S. PATENT DOCUMENTS

| | | |
|---|---|---|
| 4,611,094 | 9/1986 | Asmuth et al. ......................... 379/113 |
| 4,696,028 | 9/1987 | Morganstein et al. .................. 379/213 |
| 4,747,127 | 5/1988 | Hansen et al. ............................ 379/94 |
| 4,897,866 | 1/1990 | Majmudar et al. ....................... 379/94 |
| 5,001,710 | 3/1991 | Gawrys et al. ........................... 379/94 |
| 5,008,930 | 4/1991 | Gawrys et al. ......................... 379/211 |
| 5,036,535 | 7/1991 | Gechter et al. ........................ 379/210 |
| 5,068,892 | 11/1991 | Livanos ................................. 379/221 |
| 5,097,528 | 3/1992 | Gursahaney et al. .................. 379/267 |
| 5,119,474 | 6/1992 | Beitel et al. ............................ 395/154 |
| 5,241,580 | 8/1993 | Babson, III ............................ 379/201 |
| 5,299,260 | 3/1994 | Shaio ..................................... 379/266 |
| 5,323,452 | 6/1994 | Dickman et al. ...................... 379/201 |
| 5,335,268 | 8/1994 | Kelly, Jr. et al. ...................... 379/220 |
| 5,345,380 | 9/1994 | Babson, III et al. .................. 379/201 |

*Primary Examiner*—Krista Zele
*Assistant Examiner*—Daniel S. Hunter
*Attorney, Agent, or Firm*—Welsh & Katz, Ltd.

[57] ABSTRACT

A device for programming script sets in a telephone system having a network, a programmable routing vector to route incoming calls from the network, an application to selectively receive calls from the routing vector, a programmable application vector to selectively receive calls from the application, and a plurality of agent groups to selectively receive calls from the application.

21 Claims, 19 Drawing Sheets

SCRIPT EDITING FACILITY FLOW WINDOW

EXPOSED SCRIPT EDITING FACILITY WINDOW

NEW SCRIPT DIALOG BOX

SEF NEW SCRIPT WINDOW

DIALOG BOX FOR OPEN SCRIPT

SCRIPT EDIT FACILITY OPEN SCRIPT WINDOW

SEF CLOSE SCRIPT (EDIT)

DELETE SCRIPT DIALOG BOX

QUIT SCRIPT (AN EDIT WAS MADE)

VIEW SCRIPT DIALOG BOX

SCRIPT EDITING FACILITY VIEW WINDOW

SAVE SCRIPT AS DIALOG BOX

SCRIPT EDITING FACILITY ACTION DIALOG BOX

ACTIVATE SCRIPT OPTION DIALOG BOX

CANCEL SCRIPT DIALOG BOX

ACTIVATE OVERRIDE DIALOG BOX

CANCEL OVERRIDE DIALOG BOX

DEVICE FOR PROGRAMMING SCRIPT SETS IN A TELEPHONE SYSTEM

This is a continuation of application Ser. No. 08/523,844, filed on Sep. 5, 1995 now abandoned, which is a continuation of application Ser. No. 08/328,979, filed Oct. 24, 1994, now abandoned, which is a continuation of application Ser. No. 07/975,353 filed Nov. 12, 1992 now abandoned.

BACKGROUND OF THE INVENTION

The present invention relates to programming devices for a telephone system.

In the past, telephone systems have been provided for handling calls by a user. However, these systems have usually been hard-wired by the manufacturer, and do not provide sufficient flexibility for the customer's need at the site of the user. Thus, it is desirable to provide such systems which may be modified in accordance with the user's needs.

SUMMARY OF THE INVENTION

A principal feature of the present invention is the provision of a programming device for a telephone system.

The device of the present invention is programed by the user with script sets, and comprises means for manipulating the script sets, means for editing the script sets, and means for performing tools for the script sets.

A feature of the invention is that the user may initialize and modify operation of the telephone system in accordance with the users needs.

Another feature of the invention is that the user may readily program the device using the script sets to form the system in accordance with the requirements of the user.

A further feature of the invention is that the user may form the desired system at the site of the user by programming the script sets.

Another feature of the invention is that the program includes multiple script classes which are programmed to route the incoming telephone calls.

Yet another feature of the invention is that the program includes multiple script types which may be programmed by the user.

Further features will become more fully apparent in the following description of the embodiments of the invention, and from the appended claims.

DESCRIPTION OF THE PREFERRED EMBODIMENTS

Figure 1:
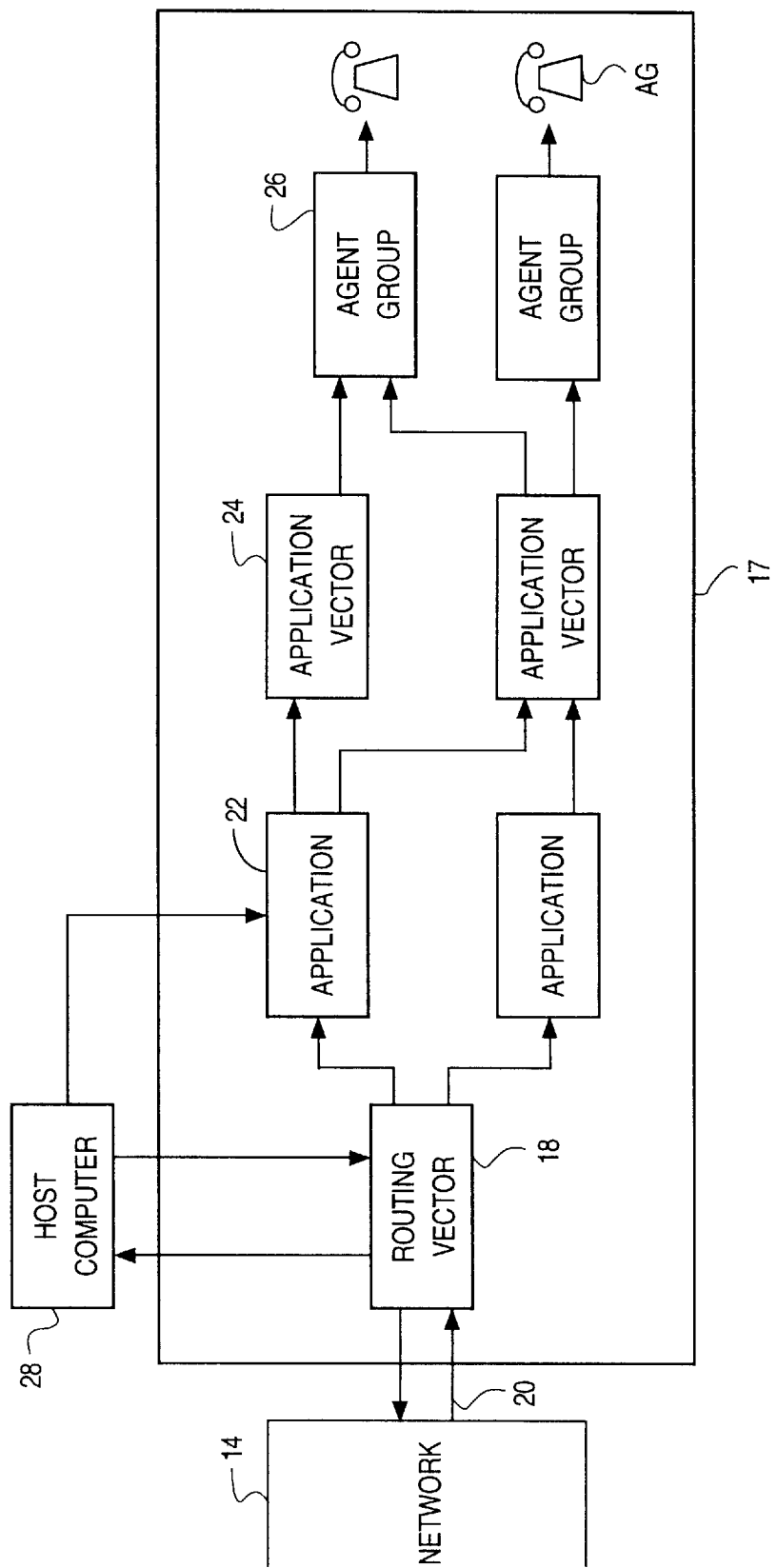
FIG. 1 is a block diagram of a control device for the network of a telephone switching system.

Referring now to FIG. 1, there is shown a control device for a telephone switching system. The telephone system 12 has a network 14 which is connected to a switching system such as an Automatic Call Distributor (ACD) 17, included in the control device.

The control device has a routing vector or script 18 to receive incoming calls from a trunk 20 connected to the network 14 of the telephone system. The routing vector 18 may route calls to an application 22 which in turn directs the calls to an application vector 24. For purposes of this application, a vector is considered to be one or more statements or instructions in the program for a computer or similar device. The application vector 24 routes the calls from the application 22 to one or more agent groups 26 for handling by one or more agents Ag associated with the agent groups 26.

As shown, the routing vector 18 is also connected to a host computer 28 which may process calls coming into the ACD 17. The host computer 28 may direct the incoming calls to the application 22, as will be seen below.

The ACD 17 of the control device may comprise a suitable computer or Central Processing Unit (CPU) having a random access memory (RAM) and Read Only Memory (ROM) for processing information related to the incoming telephone calls, and route the incoming telephone calls. As will be seen below, the routing vector 18, as well as the application 22 and application vector 24, may be controlled by the user at the location of the control device, by programming the computer with high level statements in a high level language for the computer to make control of the control device relatively simple to define.

Figure 2:
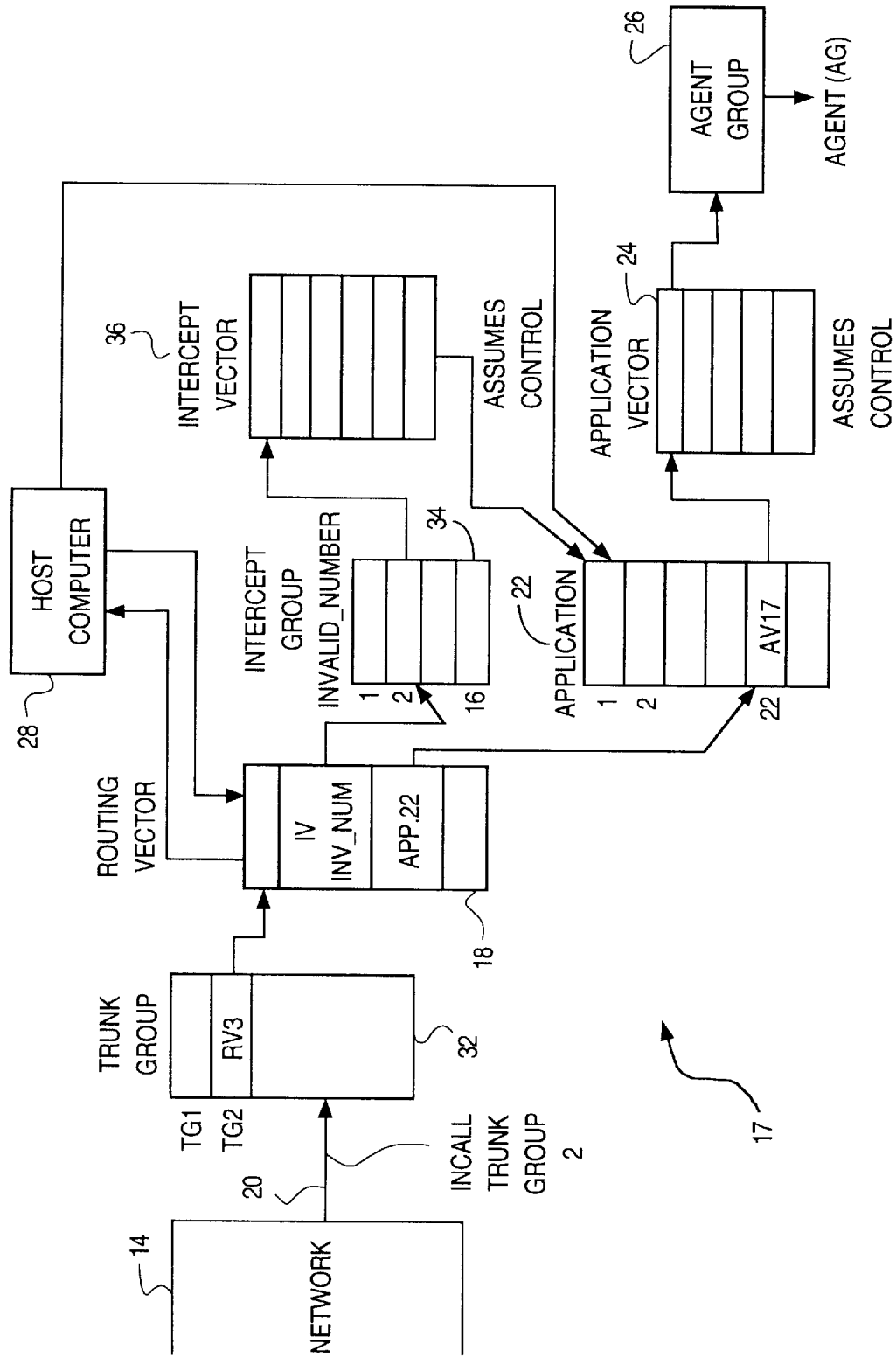
FIG. 2 is another block diagram of the control device of FIG. 1.

With reference to FIG. 2, an incoming call from the network 14 is presented to the control device on an incoming call trunk group 2 of a trunk group 32 having a plurality of separate locations for processing the calls as defined by the user through suitable programming of the device. As shown, the incoming call trunk group 2 is programmed to direct the calls to Routing Vector 3 (RV 3) of the routing vector 18 having a plurality of possible locations. In this case, the call is presented to routing vector 3, as defined in the trunk group 32.

The routing vector 3 (RV 3) then executes a series of defined steps which is accomplished by previous programming of the computer. Such steps may include a jump to an intercept group 34 in the case of a fault condition, with the intercept group 34 having a plurality of separate locations as defined by programming the computer. The intercept group 34 directs calls to an associated intercept vector 36 having a plurality of separate locations, with the intercept vector 36 being based upon the group and intercept class of the call. The intercept vector 36 then assumes control of the call. In the specific example shown, the routing vector 3 (RV 3) jumps to intercept group INVALID NUMBER. The INVALID NUMBER group and the calls assigned intercept class translate to intercept vector 1.

In another case, the routing vector 18 may direct the calls to the application 22 (App 22) having a plurality of separate locations which are defined by the user through previous programming of the computer. As shown, the routing vector 18 transfers the calls to application 22 (via AV 17) which in turn routes the call to an application vector 24 having a plurality of locations, after which the application vector 24 assumes control of the calls. In turn, the application vector 24 may direct the call to one or more of the agent groups 26 for handling of the call by one or more agents Ag associated with the agent groups 26. If desired, one or more locations of the intercept vector 36 may transfer the calls to one or more locations of the application 22 which ultimately directs the call to the application vector 24 and the agent groups 26.

In a preferred form, each trunk 20 is assigned to an intercept class, and may point to the same or different routing vectors 18. The intercept vector 36 utilized in the case of a failure may usually constitute an announcement or recorded tone, as defined by the user. Also, the application vector 24 may include an announcement, and ultimately directs the calls to the agent group 26.

As shown in FIGS. 1 and 2, the routing vector 18 is connected to the host computer 28, and informs the host computer 28 of an incoming call. The routing vector 18 may request information concerning the call from the host computer 28, and the host computer 28 may request information concerning the call from the routing vector 18 which is obtained by the routing vector 18 from the network 14, which information is supplied by the routing vector 18 to the host computer 28. Also, the application vector 18 may request the host computer 28 to route a given call depending upon the nature of the call, as defined by the user, and the host computer 28 may direct the calls to the application 22 for ultimate disposition at the agent group 26.

The routing of calls is defined by information supplied by the network 14 which may be a Trunk Group which is the number of the inbound trunk group on which the call was presented, an Internal Directory Number (DID) to which the call should be presented, a Dialed Number Identification Service (DNIS) which identifies the called number, or an Automatic Number Identification (ANI) which comprises an area code, an area code+exchange code, or an area code+ exchange code+station address. Thus, the control device routes the calls using this information associated with an incoming call for routing by the ACD or host computer 28.

The ACD 17 provides an interaction with the network 14 of the telephone system for improved handling of the incoming calls. When a valid call has been received by the routing vector 18, the routing vector 18 retrieves information concerning the call from the network 14 which is collected by the trunk 20. The routing vector 18 is responsible for any error handling during collection of digits from the network 14. Each trunk group 32 has a routing vector 18 and route class assigned to it.

The routing vector 18, the intercept group 34, the intercept vector 24, the application 22, and the application vector 22 essentially serve as different switches to direct calls in the ACD. Thus, in accordance with the present invention, the user may define the interaction of these switches alone, or in combination with the host computer 28 in a simplified manner through use of the high level statements in programming the computer, as will be seen in the Examples below.

EXAMPLE I

The following is a simple example of a call being routed, as programmed by the following statements for the computer, of a call being routed based upon the ANI collected from the network 14. No check is being made here on whether the network information is collected successfully. In this case, if the network information retrieval fails or the ANI translation fails, the ROUTE TRANSLATION will make use of the default routing information established at the point the vector was accessed, i.e., the trunk group's routing information.
(1) RETRIEVE NETWORK
(2) INFORM HOST ON ARRIVAL
(3) TRANSLATE ANI
(4) ROUTE TRANSLATION

EXAMPLE II

The following is an example of a route on DNIS with the "ANI Required Indicator" being checked. The default routing information was established prior to the activation of the routing vector 18 and is that of the trunk group 32.

Upon entry, the trunk 20 is requested to RETRIEVE the network information. If a failure occurs while retrieving the network information, control is passed to the intercept vector 36 associated with the intercept group Invalid Procedure and the call's intercept class.

On a successful network data collection, the vector INFORMs the host computer 28 of the call's arrival and TRANSLATES the DNIS to its routing information. If the translation fails, the vector script ROUTEs the call based upon the initial translation of the trunk group information.

On a successful DNIS translation, the vector script checks if ANI is required for the DNIS number. If it is required, the script REQUESTs the ANI from the network 14. If the ANI request fails, the call is sent to the intercept vector 36 specified by the call intercept class and the intercept group 34 Invalid Number.

Upon either ANI not required or successful ANI retrieval, the call is routed based upon the DNIS route translation.
(1) RETRIEVE NETWORK INFORMATION
(2) IF RESULT EQ SUCCESS GO TO 4
(3) INTERCEPT INVALID_PROCEDURE
(4) INFORM HOST ON ARRIVAL
(5) TRANSLATE DNIS
(6) IF RESULT EQ SUCCESS GO TO 8
(7) ROUTE TRANSLATION
(8) IF ANI_IND EQ ANI_NOT_REQUIRED GOTO 12
(9) REQUEST NETWORK ANI_IND
(10) IF RESULT NE FAIL GOTO 12
(11) INTERCEPT INVALID_NUMBER
(12) ROUTE TRANSLATION

EXAMPLE III

In the following example, if the vector script 18 is unable to retrieve the network information and translate the ANI into routing information, the call is treated with intercept handling. If the call's ANI is collected and translated successfully, the vector script checks if the ANI is flagged as being a candidate for host (host computer 28) routing. If not, the script informs the host computer 28 of the arrival and routes the call based upon the ANI translation.

If the ANI is flagged as preferring host routing, the host computer 28 is provided with a call arrival indication and REQUEST for instruction. The vector waits 2 seconds for a host route.

If the host computer 28 fails to respond or the message is unable to be transmitted to the host computer, the call is routed based upon the previous ANI translation.

If the host computer 28 responds within the 2 seconds, the vector "translates" the host provided routing information and the subsequent ROUTE TRANSLATION makes use of the host provided routing information to route the call.
(1) RETRIEVE NETWORK INFORMATION
(2) IF RESULT EQ SUCCESS GOTO 4
(3) INTERCEPT INVALID_NUMBER
(4) TRANSLATE ANI
(5) IF RESULT EQ SUCCESS GOTO 7
(6) INTERCEPT INVALID_NUMBER
(7) IF HOST_ROUTE_PREFERRED EQ YES GOTO 10
(8) INFORM HOST ON ARRIVAL
(9) GO TO 11
(10) REQUEST HOST INSTRUCTION ON ARRIVAL 2 SECONDS
(11) ROUTE TRANSLATION Thus, a program of simplified form may be programmed by the user through use of the statements by the user at the location of the control device.

Figure 3:
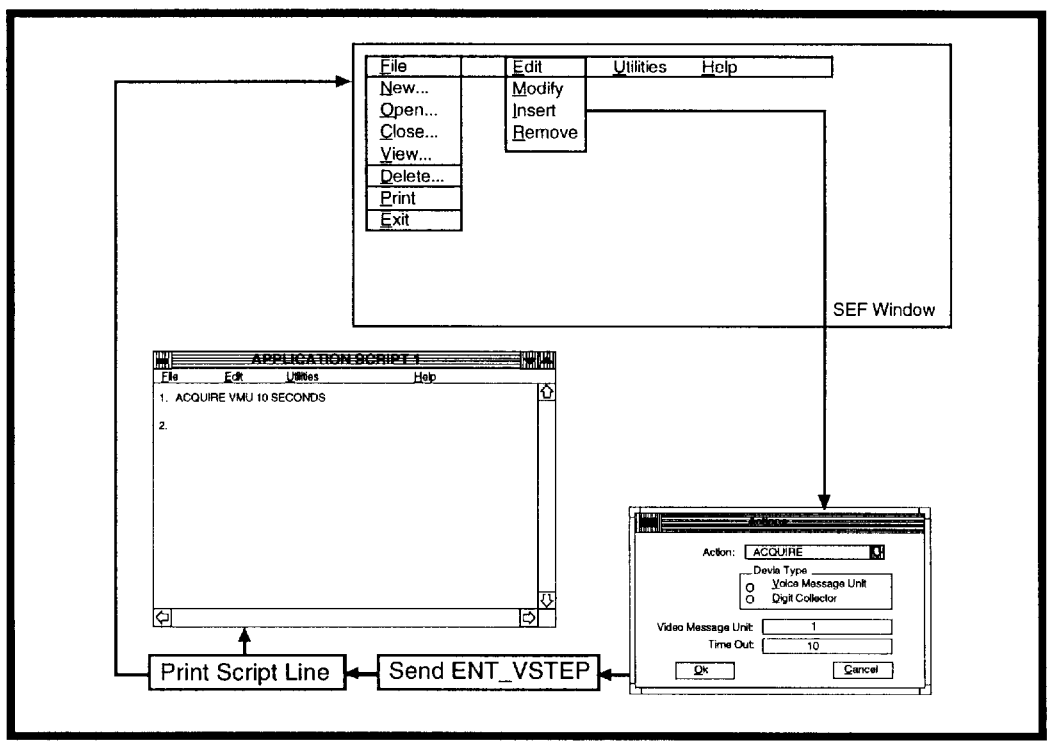
FIG. 3 is a diagrammatic view of a script editing facility flow overview in a programming device for the telephone system of the present invention.

With reference to FIG. 3, the activation of a script editing session within a Script Editing Facility (SEF) window will prevent the user from accessing a Terminal Emulation window, even when the SEF window with an open script is minimized (iconized). The program for the vectors or script provides the capability to define a single SEF window. Access to the SEF window is allowed through the Command window's SEF icon. Within the SEF window, the user has the ability to define and modify a set of scripts, by the use of the dialogued boxes. Script sets are stored in the system, making it possible for the script sets to be easily accessed by other terminal users. Also, the user is able to launch and cancel scripts from the SEF window.

All of the usual Presentation Manager window manipulation controls are available to the user to allow effective management of the monitor display space. The user is able to minimize the window while attention is being focused on other windows. Minimizing the window will reduce the window to an icon on the screen. Closing the window cancels the script editing session, minimize the SEF window, and return focus to the Main Command window.

The SEF user interface is a line editor driven by menu bar selections and dialog box interactions. A window is presented to the user for the monitoring and the selection (via pointing and clicking or cursoring) of script step edits. FIG. 3 demonstrates the flow of "creating a new vector or script." Prior to this flow the user had selected the Script menu option "New." This procedure causes retrieve script and open script commands to be sent to the Automatic Call Distributor (ACD). After the user's "Script 1" window is opened, the user may select, via choosing SEF's menu Edit selection Insert option, a script Action type dialog box. In this example, the user has selected and "OK'd" the "ACQUIRE VMU" action command. When "OK'd", the "Script Editing Facility Script 1" window is updated. After this is accomplished, the user may choose to continue the editing session or quit the Script menu option "Exit."

Figure 4:
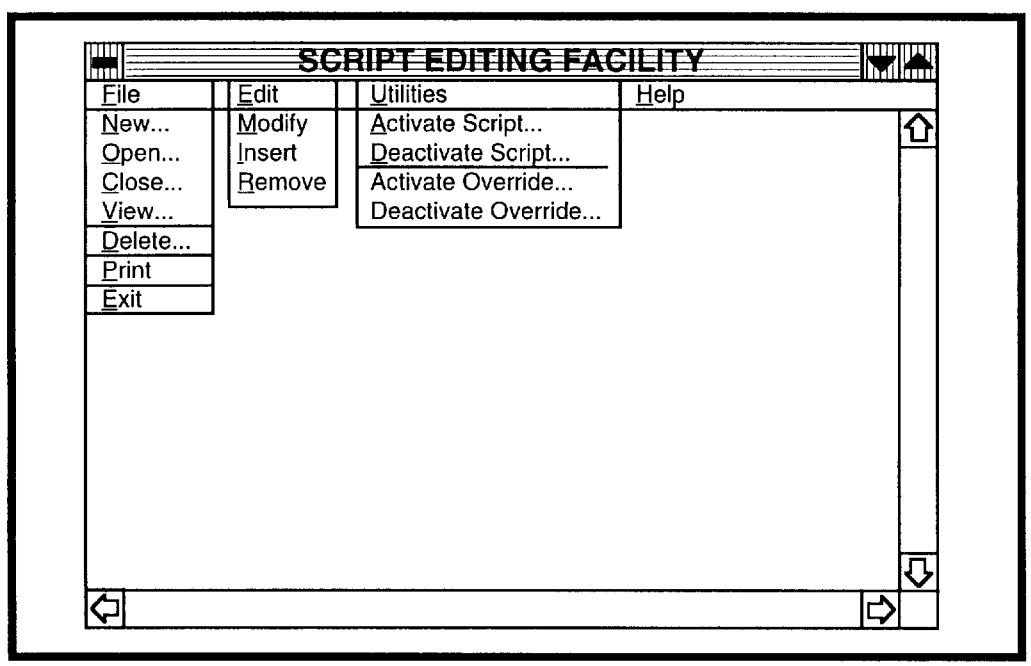
FIG. 4 is a diagrammatic view of an exposed script editing facility window for the device of FIG. 3.

With reference to FIG. 4, this window depicts the main SEF menu bar with all "drop down" selections exposed. At this level the user may perform a SEF editing session. This procedure includes manipulating script sets (File), script steps (Edit), and script tools (Utilities). The menu selections in this window operate as follows:

File: This selection enables the user to work with Scripts. The user of this selection's options has the ability to:
1. create scripts (New)
2. read an existing script and display it for modification (Open)
3. remove from the screen the active window and all associated dialog boxes (Close)
4. review another existing script (View)
5. remove an existing script (Delete)
6. prepare and schedule a script for printing (Print)
7. end a session (Exit)

Edit: With this selection the user is able to change (Modify) original script steps, create (Insert) new script steps, and delete (Remove) original script steps.

Utilities: Using the options in this selection, the user may "turn on" (Activate Script) or "turn off" (Deactivate Script) a script. Also, the user may make a replacement of a script associated with an application (Activate Override), or rescind the association of a script with an application (Deactivate Override).

The manipulation of script sets is accomplished using the File selections: New, Open, Close, View, Delete, Print, and Exit.

Figure 5:
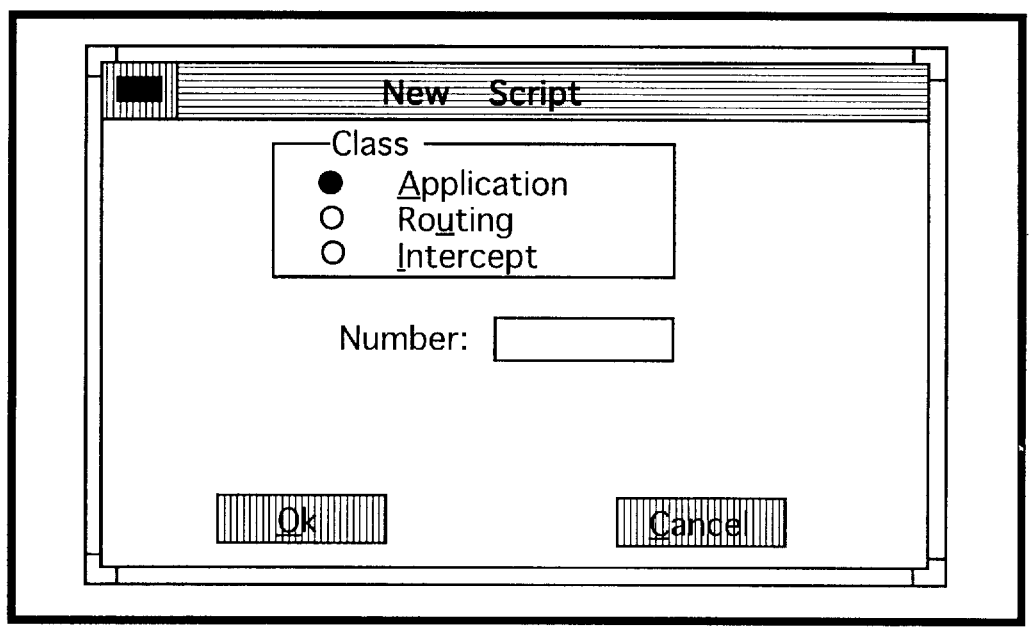
FIG. 5 is a diagrammatic view of a new script dialog box.

The selection of the File option New allows the user to enter a new script via the dialog box shown in FIG. 5. This dialog box allows the user to create a script description for the new script that is to be created. The user accomplishes this activity by:
1. selecting via the Class group box selection field, the required one of three classes for the script
2. entering the identifier of the new script in the Number: entry field The pushbutton controls in this dialog box operates as follows:
1. OK: If the number does not exist in the system, this pushbutton will close the dialog box and initialize a New Script Window. If the number does exist, this pushbutton causes a warning message that will inform the user of the undesirable situation.
2. Cancel: This control closes this dialog box with no other action.

Figure 6:
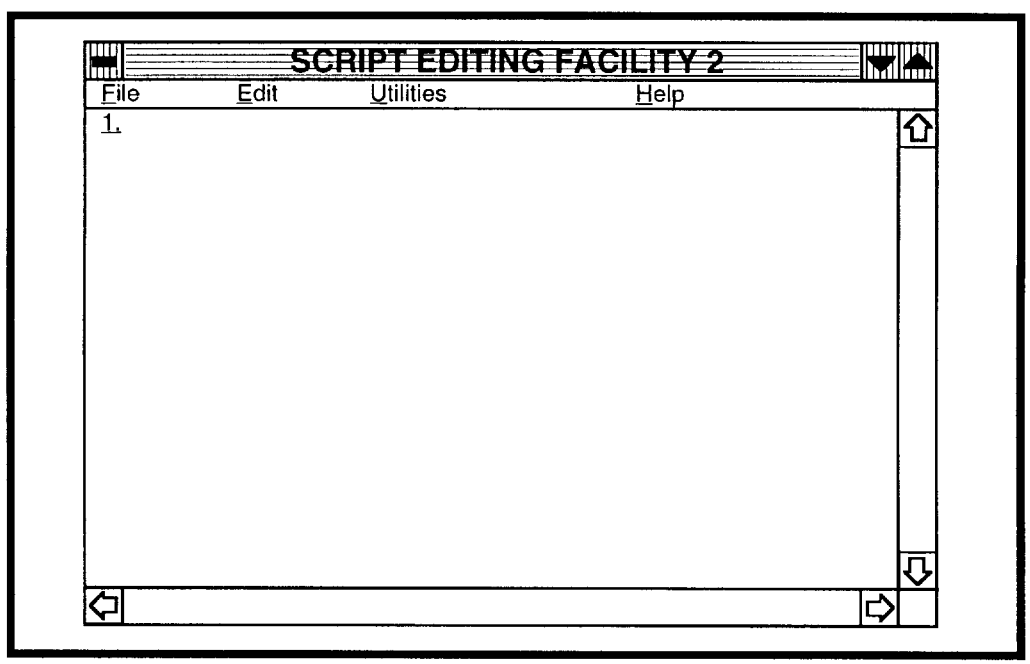
FIG. 6 is a diagrammatic view of a new script window.

After filling in the entry field and pushing the "OK" button, the user is presented with the window shown in FIG. 6. The user will see the output of newly inserted script steps in this window.

Figure 7:
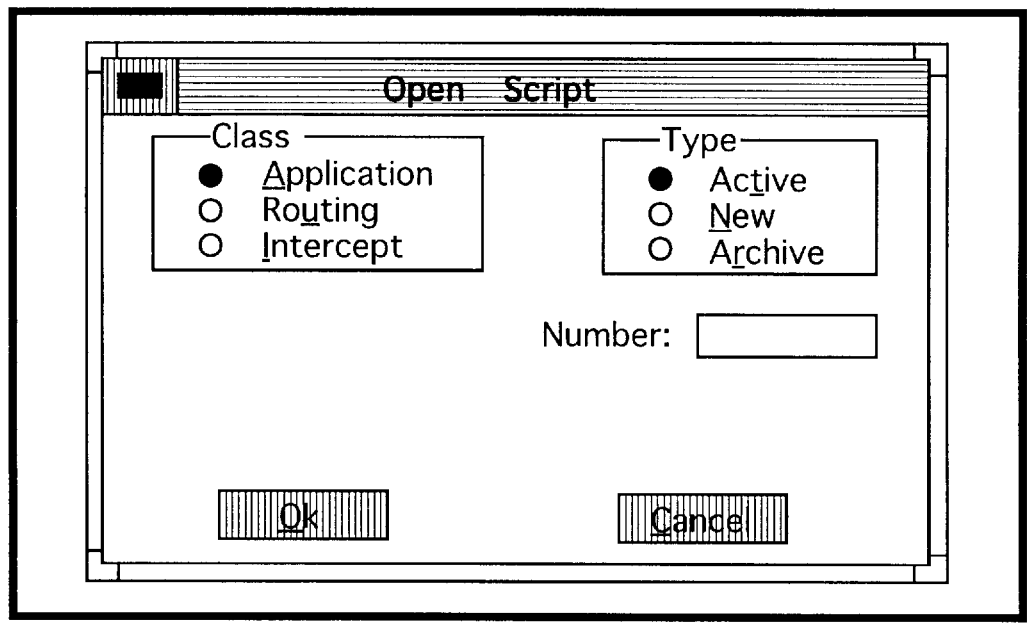
FIG. 7 is a diagrammatic view of a dialog box for open script.

The selection of the File option Open will produce the dialog box shown in FIG. 7. The user fills out this dialog box to open an existing Script. This dialog box allows the user to create a script description for an existing script that is to be edited. The user accomplishes this activity by:
1. selecting via the Class group box selection field, the required one of three classes for the script
2. selecting via the Type group box selection field, the required one of three script types for the script
3. entering the identifier of the new script in the Number: entry field The pushbutton controls in this dialog box operates as follows:
OK: If the Number does exist in the system, this pushbutton closes the dialog box and initializes an Open Script Window with the Script displayed with step numbers and a blank line as the last step. If the Number does not exist, this pushbutton causes a warning message that informs the user of the undesirable situation.

Cancel: This control closes this dialog box with no other action.

Figure 8:
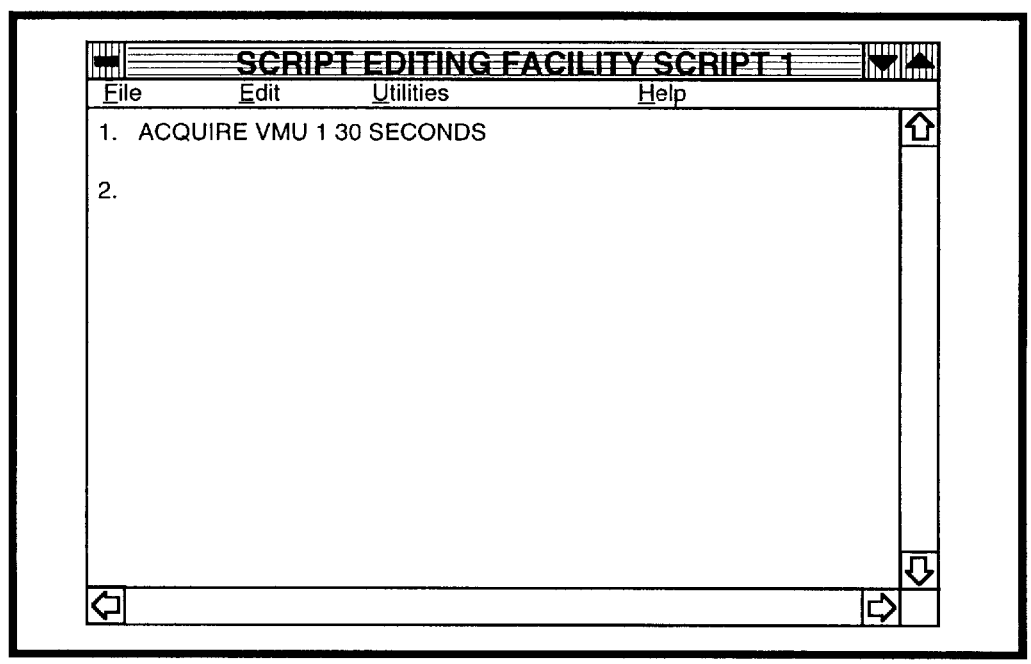
FIG. 8 is a diagrammatic view of a script edit facility open script window.

After filling in the entry field and pushing the "OK" button, the user is presented with the window shown in FIG. 8. After this window is displayed, the user may use either a mouse or cursor keys to select the line which may be edited. By default, the initial cursor position is on a new blank line at the end of the script allowing the user to append new lines to the script.

Figure 9:
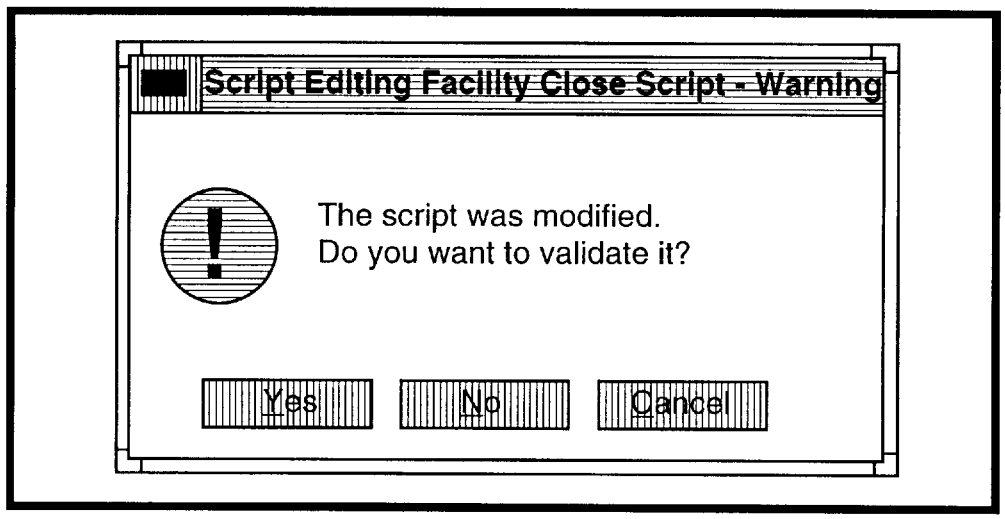
FIG. 9 is a diagrammatic view of a close script.

Selecting File option Close will check to see if any changes had been made to the current script. If no changes had been made, the system will issue a Close command and clear the client area of the window. If changes had been made, the system displays the message box shown in FIG. 9. This warning box offers the user three options. If the user selects Yes, the system sends a command to the ACD to validate the script. If the user selects No, the system issues a close command to the ACD without validating the script. If the user selects Cancel, the system returns the user to the Editing session without closing and validating the script.

Figure 10:
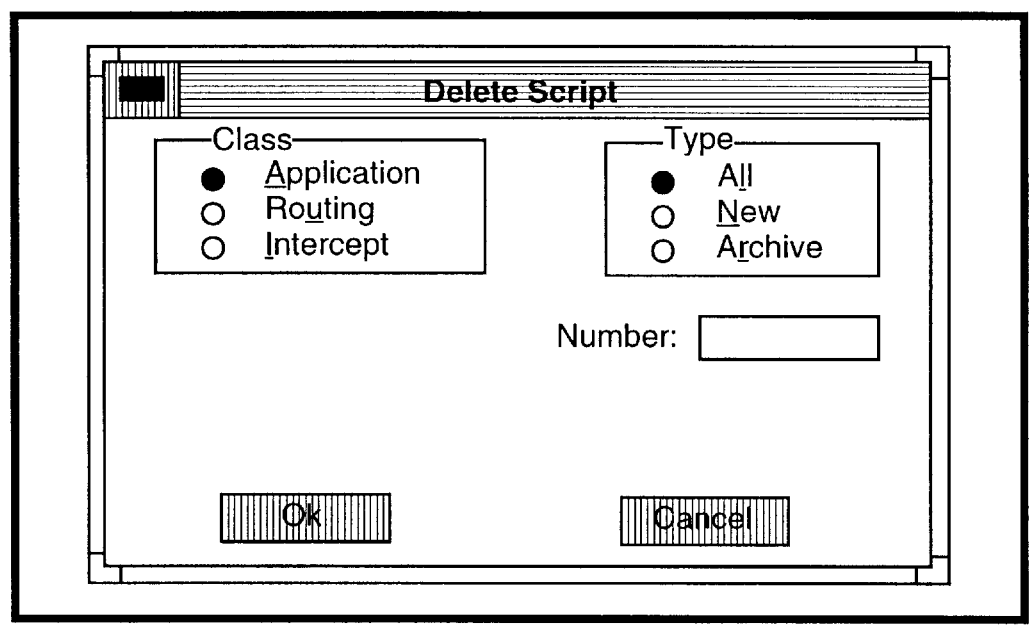
FIG. 10 is a diagrammatic view of a delete script dialog box.

In the current SEF window, choosing the File option Delete allows the user to remove scripts from the system. The dialog box shown in FIG. 10 is presented in order to accomplish this purpose. This dialog box allows the user to create a script description for an existing script that is to be deleted. The user accomplishes this activity by:

1. selecting via the Class group box selection field, the required one of three script classes for the script 2. selecting via the Types group box selection field, the required one of three script types for the script 3. entering the identifier of the new script in the Number: entry field The pushbutton controls in this dialog box operates as follows:

OK: If the Number does exist in the system, this pushbutton deletes the Script from the system. If the Number does not exist, this pushbutton causes a warning message that informs the user of the undesirable situation.

Cancel: This control closes this dialog box with no other action.

The File Print option allows the user to print the script text that is currently being edited.

Figure 11:
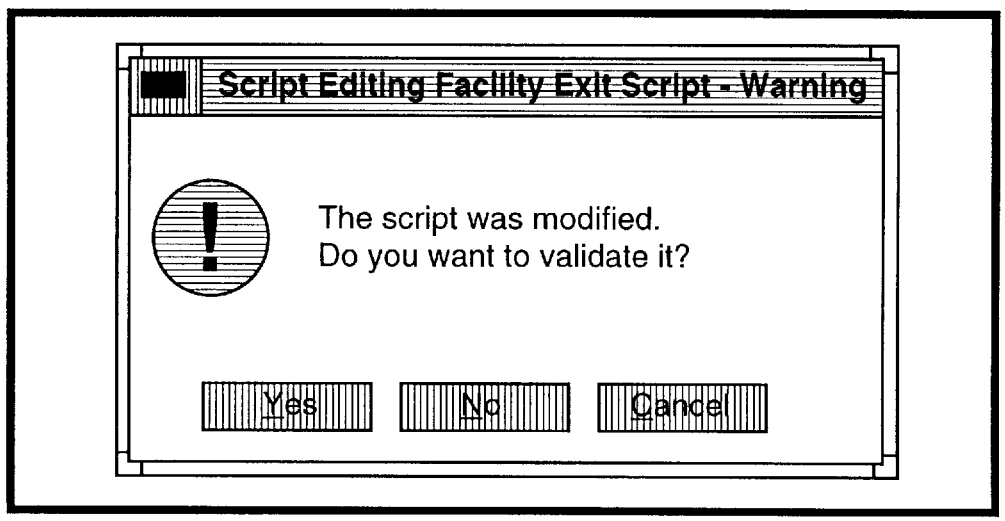
FIG. 11 is a diagrammatic view of a quit script.

Choosing the File option Exit causes the system to check if any changes had been made to the current script. If no changes had been made, the system issues a Close command to the system, and clears the client area of the window. If changes had been made, the system displays the warning box shown in FIG. 11. This warning box offers the user three options. If the user selects Yes, the system sends a command to the ACD to validate the script. If the user selects No, the system issues a Close command to the ACD without validating the script. If the user selects Cancel, the system returns the user to the Editing session without closing and validating the script.

Figure 12:
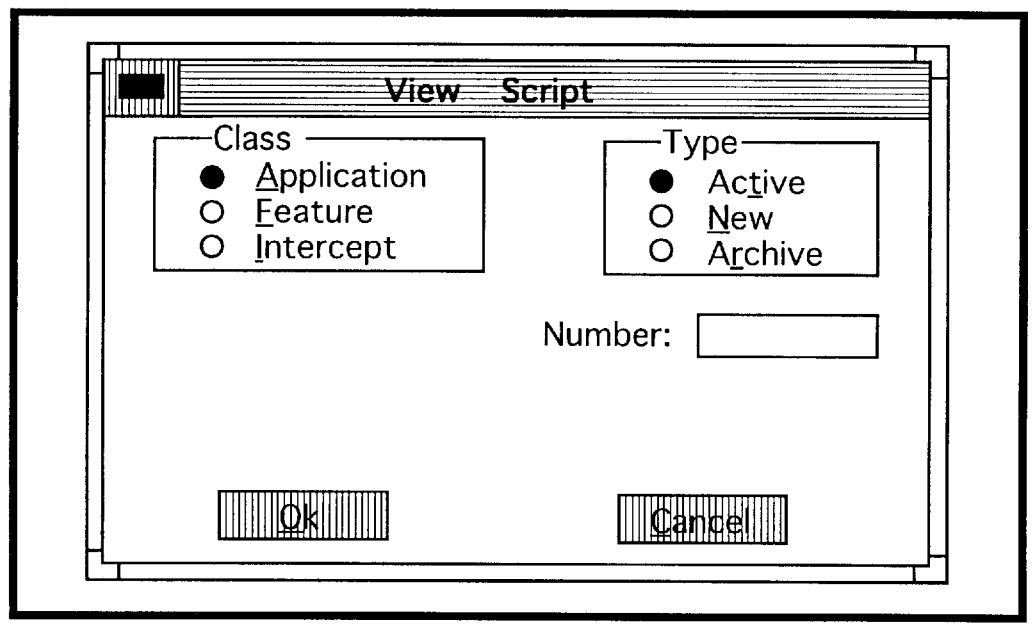
FIG. 12 is a diagrammatic view of a view dialog box.

Selecting the File View option allows the user to display, copy (Save As), and Print a different script in a secondary window. The dialog box shown in FIG. 12 is used to initiate the view window. This dialog box allows the user to create a script description for an existing script that is to be displayed. The user accomplishes this activity by:

1. selecting via the Class group box selection field, the required one of three script classes for the script 2. selecting via the Type group box selection field, the required one of three script types for the script 3. entering the identifier of the script in the Number: entry field The pushbutton controls in this dialog box operates as follows:

OK: If the Number does exist in the system, this pushbutton closes the dialog box and displays the Script from the system in a secondary window. If the Number does not exist, this pushbutton causes a warning message that informs the user of the undesirable situation.

Cancel: This control closes this dialog box with no other action.

Figure 13:
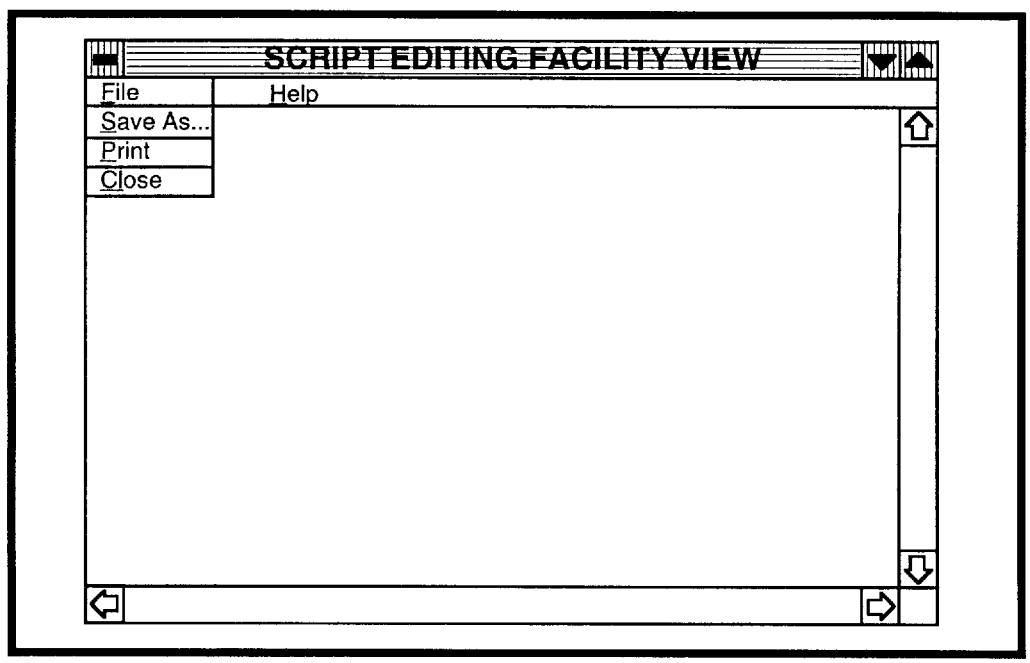
FIG. 13 is a diagrammatic view of a script editing facility view window.

After filling in the entry fields and pushing the "OK" button, the user is presented with the window shown in FIG. 13 with the selected script shown in the window so that the user may view it. From the View bar File selection, the user may choose three different options when working with the script displayed in the secondary window:

1. Save As will prompt the user via the dialog box for the identifier of the new script that is to be created. The new script is created from the current script that is displayed in the secondary View window.

2. Print prepares and schedules for printing, the current script that is displayed in the secondary view window.

3. Close removes from the screen, the current View secondary window and return control to the SEF main window.

Figure 14:
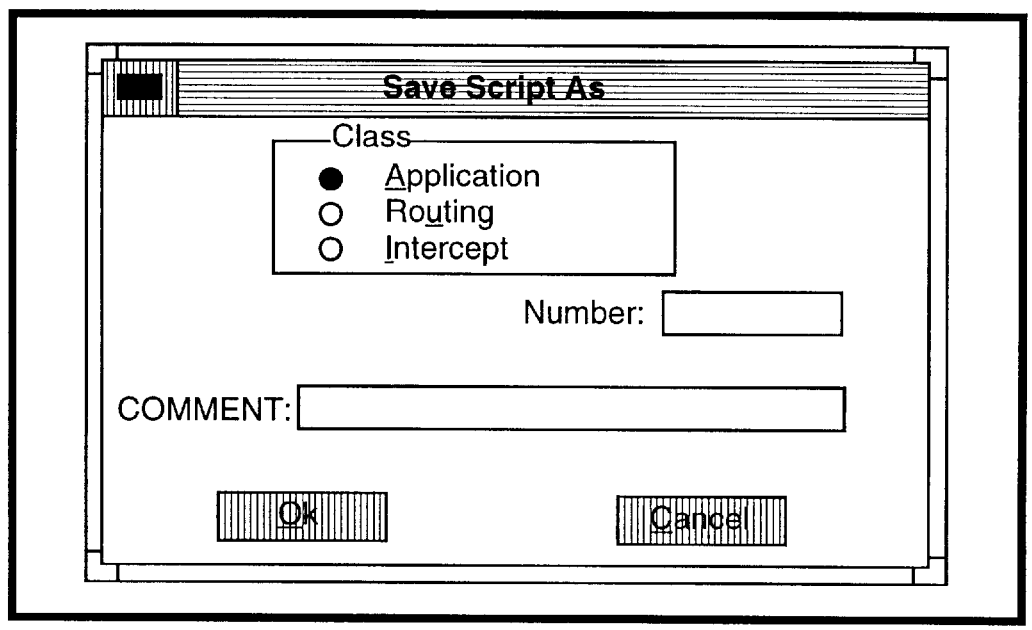
FIG. 14 is a diagrammatic view of a save script as dialog box.

While in the View Window, the user may copy the displayed script to another script by selecting the Save As option and filling in the entry fields in the dialog box shown in FIG. 14. This dialog box allows the user to create a script description for a new script that is to be created from the current script which is displayed in the secondary View window. The user accomplishes this activity by:

1. selecting via the Type group box selection field, the required one of three script types for the script 2. entering the identifier of the new script in the New Number: entry field 3. optionally entering information in the Comment: entry field (displayed only for the script Class of feature)

This new script Class is predetermined by the script class of the current script that is displayed in the secondary View window.

The pushbutton controls in this dialog box operates follows:

OK: If the Number does not exist in the system, this pushbutton closes the dialog box and creates the new Script on the system. If the Number does exist, this pushbutton causes a warning message that informs the user of the undesirable situation.

Cancel: This control closes this dialog box with no other action.

View's Print option allows the user to print the script text that is currently being viewed. Choosing View's Close option allows the user to close the SEF's View secondary window.

The next menu item in the Script Editing Facility window menu bar is the Edit option. Under this pull-down option, the user may chose to Modify, Insert, and Remove script sets. To use these options, the user must first create a new or open an existing script that the user wants to edit. Second, the user, using a mouse or the keyboard arrow keys, selects the script step in SEF's Main Window that the user wants to modify, insert, or remove. Finally, the user may select the activity (Modify, Insert, or Remove) the user wants to perform on the script step selected from the Edit option pull-down.

Choosing the Modify option will produce the Action dialog box, as shown in FIG. 3, filled with the selected script step's entry field data.

Choosing the Insert option opens the script window line at the selected step. This operation produces the Action dialog box. Also, it causes all the "GOTO's" pointing to that line and subsequent lines to be highlighted. User interaction begins at the selected open line and continues from that point until the user closes/exits the script editing session or the user moves the selection cursor to another step. At the time of move and until a new insertion point is selected, a blank step is opened so that the user may insert new steps into the script.

To perform the Remove option, a non-blank step must be selected before the selection of the Remove option. Selection of the Remove option deletes the selected step from the script and the script window.

Figure 15:
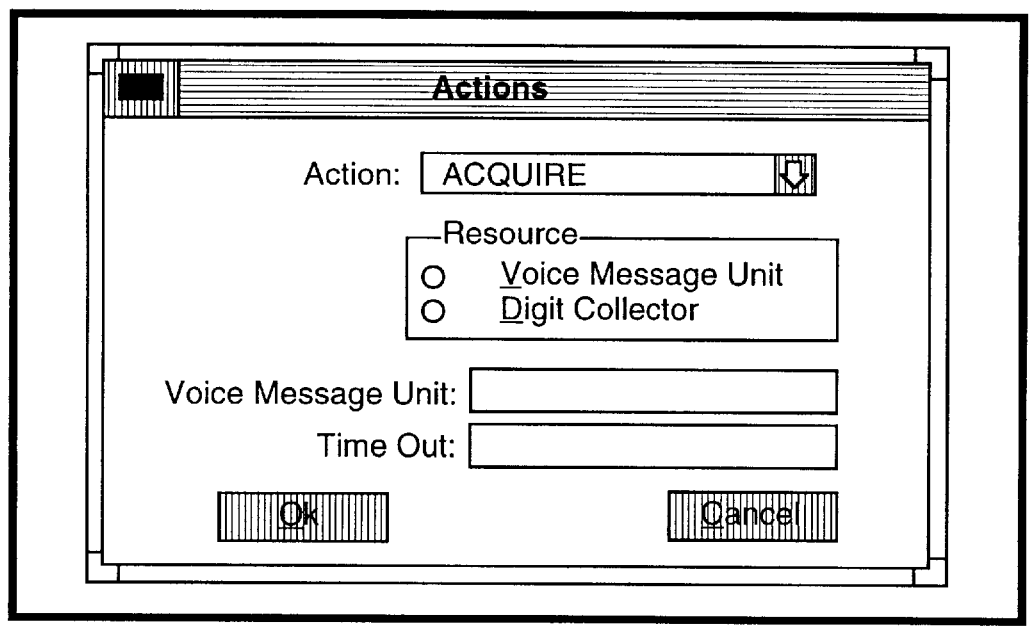
FIG. 15 is a diagrammatic view of a script editing facility action dialog box.

Either choosing the Modify, insert or pressing the ENTER key when a blank line step is selected causes the Actions dialog box of FIG. 15 to be displayed. This dialog box allows the user to create a script step activity that is to be created or changed in the current SEF window. There are 19 Actions that are supported by the dialog box as follows:

ACQUIRE
CHANGE PRIORITY
CONVERT
DISCONNECT
GOTO
INTERCEPT
QUEUE
REMOVE
RETURN
START
ACTIVATE FEATURE
COLLECT
DELAY
FLASH
IF GOTO
PLAY
RECORD MESSAGE
RESET
ROUTE

Each of the nineteen Actions has different option selections displayed in the dialog box.

The dialog box shown in FIG. 15 is the default dialog box used to compose an ACQUIRE script step. The user accomplishes this activity by:

1. selecting the ACQUIRE action from the Action drop-down entry list
2. selecting via the Resource group box selection field, the required one of two Resource types for the script step
3. entering the Voice Message Unit identifier in the Voice Message Unit: entry field
4. optionally entering Time Out information in the Time Out: entry field The pushbutton controls in the Action dialog box operates as follow:

OK: This pushbutton causes the selected Script Step in the SEF window to be changed, and a new blank step is created for additional editing. Also, the edited Step updates the system.

Cancel: This control closes this dialog box and unselect any selected lines, and focus is returned to the main SEF menu bar.

The next menu item in the Script Editing action bar, as shown in FIG. 4, is the Utilities option. From this pull down menu option the user is able to:

1. Activate Script which will replace the current activated script with the latest one that was created or edited.
2. Deactivate Script replaces the current active script with an earlier version.
3. Activate Override forces an individual application or multiple applications to use a specified script.
4. Deactivate Override forces an individual application or multiple applications to use the conventional application script.

Figure 16:
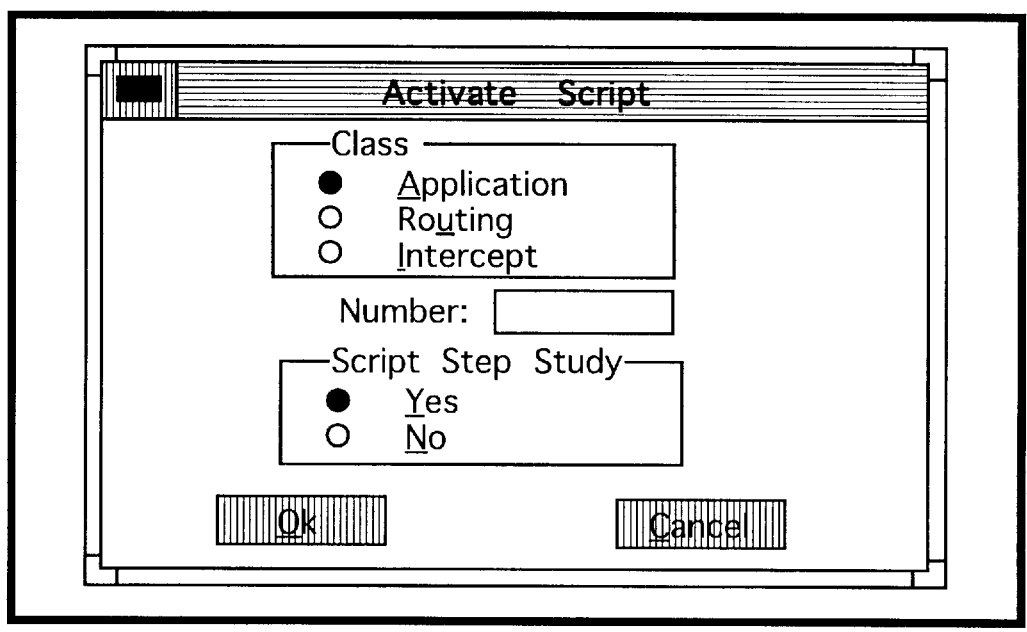
FIG. 16 is a diagrammatic view of an activate script option dialog box.

Selecting the "Activate Script" option allows the user to substitute a different script for the current active one. This is accomplished with the dialog box shown in FIG. 16.

This dialog box allows the user to create a script description for the script which is to be actuated. The user accomplishes this activity by:

1. selecting via the Class group box selection field the required one of three classes for the script
2. entering the identifier of the script in the Number: entry field
3. selecting via the Script Step Study group box selection field the required one of the two script step study flags The pushbutton controls in this dialog box operates as follows:

OK: If the Number does exist in the system, this pushbutton causes the system to activate the desired script. If the Number does not exist, this pushbutton causes the system to activate the desired script.

Cancel: This control closes this dialog box with no other action.

Figure 17:
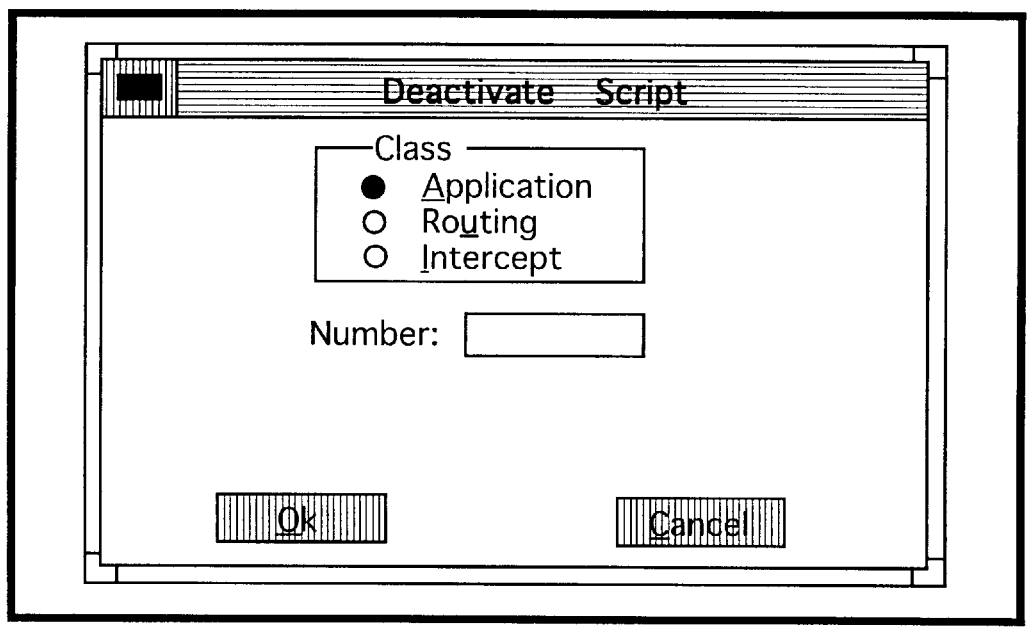
FIG. 17 is a diagrammatic view of a cancel script dialog box.

Choosing the "Deactivate Script" option effectively reverses an "Activate Script" option. When "Deactivate Script" option is selected the dialog box of FIG. 17 is active. This dialog box allows the user to create a script description for the script which is to be activated. The user accomplishes this activity by:

1. selecting via the Class group box selection field, the required one of three script classes for the script
2. entering the identifier of the script in the Number: entry field The pushbutton controls in this dialog box operates as follows:

OK: If the Number does exist in the system, this pushbutton causes the system to deactivate the desired script. If the Number does not exist in the system, this pushbutton causes a warning message which informs the user of the undesirable situation.

Cancel: This control closes this dialog box with no other action.

Figure 18:
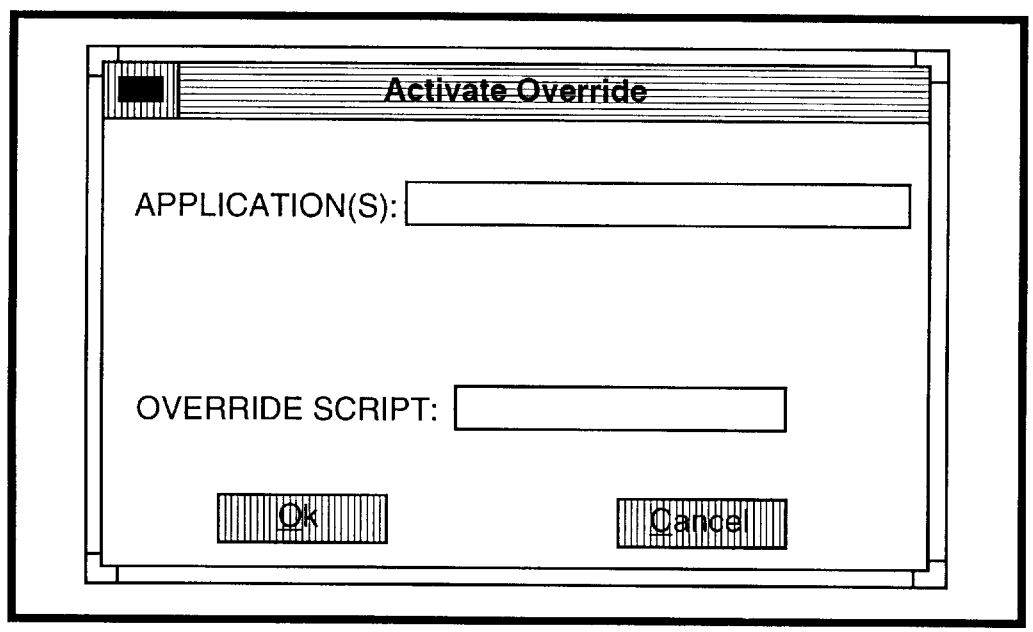
FIG. 18 is a diagrammatic view of an active override dialog box.

The "Activate Override" option provides the user with the ability to force the use of a specified script for a particular application or group of applications. This utility is called using the dialog box shown in FIG. 18. This dialog box allows the user to create an application description for the application which is to be overridden. The user accomplishes this activity by:

1. optionally entering the affected application or group of applications in the Application(s): entry field
2. entering the required overriding script identifier in the Override Script: entry field The pushbutton controls in this dialog box operates as follows:

OK: If the Application(s) and Override script exists in the system, this pushbutton causes the system to activate the desired override condition. If the Application(s) or override Script does not exist, this pushbutton causes a warning message which informs the user of the undesirable situation.

Cancel: This control closes this dialog box with no other action.

Figure 19:
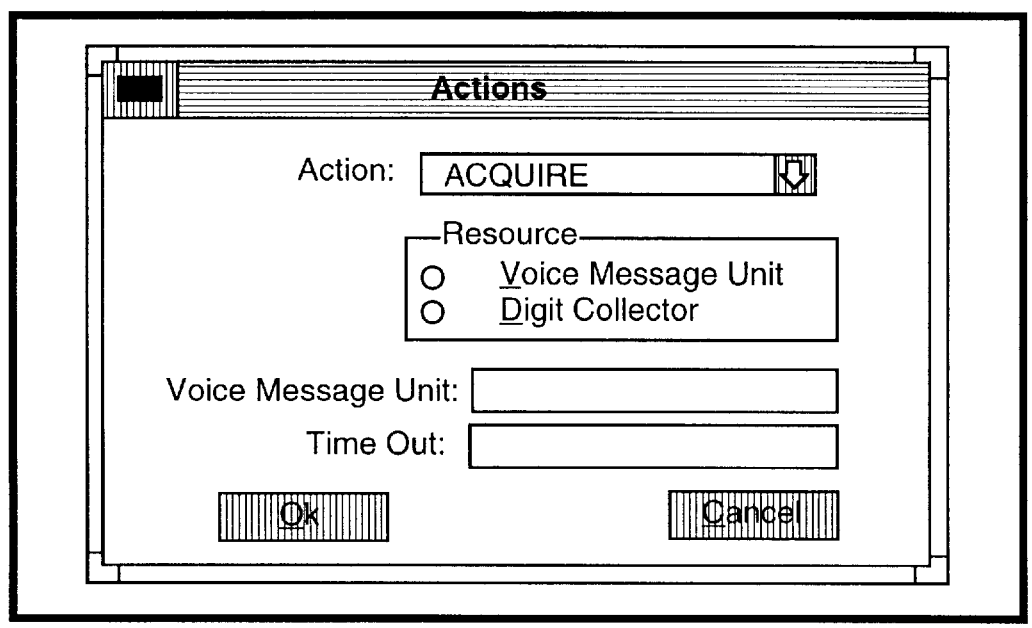
FIG. 19 is a diagrammatic view of a cancel override dialog box.

A "Deactivate Override" selection rescinds an "Activate Override." Choosing the "Deactivate Override" option produces the dialog box shown in FIG. 19. This dialog box allows the user to create an application description for the application override condition which is to be rescinded. The user accomplishes this activity by:

1. optionally entering the affected application or group of applications in the Application(s): entry field
2. entering the required overriding script identifier which is to be rescinded in the Override Script: entry field The pushbutton controls in this dialog box operates as follows:

OK: If the Application(s) and Override Script exists in the system, this pushbutton causes the system to activate the desired override condition. If the Application(s) or Override Script does not exist, this pushbutton causes a warning message which informs the user of the undesirable situation.

Cancel: This control closes this dialog box with no other action.

Thus, in accordance with the present invention, the user may readily program the device through use of scripts or vectors in order to customize the routing of incoming telephone calls in a manner as desired at the site of the user.

The foregoing detailed description has been given for clearness of understanding only, and no unnecessary limitations should be understood therefrom, as modifications will be obvious to those skilled in the art.

What is claimed is:

1. An apparatus for programming and communicating with an automatic call distributor, the apparatus comprising:
   a) a control device operatively coupled to a telephone network, the control device configured to receive incoming call data from the telephone network;
   b) a host computer coupled to the control device and configured to receive script instructions according to a user and transmit programming data to the control device in accordance with the script instructions, the host computer providing a script editing facility having an interface in the form of a plurality of menus accessible to the user;
   c) the control device further including
      c.1) a routing vector coupled to the host computer and to the telephone network, the routing vector configured to receive the programming data and to route telephone calls received from the telephone network in accordance with the received programming data;
      c.2) an application operatively coupled to the routing vector and configured to receive telephone calls directed to the application by the routing vector;
      c.3) an application vector operatively coupled to the application for selectively determining a routing path through which to direct the telephone calls received by the application;
      c.4) an intercept vector operatively coupled between the routing vector and the application to direct the telephone call received by the routing vector to a predetermined application;
   d) a plurality of telephone agent groups operatively coupled to the application through the application vector, the telephone agent groups configured to receive the telephone calls from the application via the application vector; and
   e) the host computer configured to program the routing vector in accordance with the script instructions provided by the user.

2. The apparatus according to claim 1 wherein the host computer is coupled to at least one of the routing vector and the application, and is configured to provide the programming data to at least one of the routing vector and the application in accordance with the script instructions provided to the host computer by the user, such that the telephone calls are routed to the agents along a route determined by at least one of the routing vector and the application.

3. The apparatus according to claim 1 wherein the routing vector is coupled to the host computer and receives the programming data sent from the host computer, the programming data received operative to cause the telephone calls received from the telephone network to be directed to a selected agent group based upon identification information contained in the telephone call.

4. The apparatus according to claim 3 wherein the identification information contained in the telephone call is at least one of a trunk group number, an internal directory number, a dialed number identification service, and an automatic number identification.

5. The apparatus according to claim 1 wherein the application is coupled to the host computer and receives the programming data sent by the host computer, the programming data received operative to cause the telephone calls received from the telephone network to be directed to a selected agent group based upon identification information contained in the telephone call.

6. The apparatus according to claim 5 wherein the identification information contained in the telephone call is at least one of a trunk group number, an internal directory number, a dialed number identification service, and an automatic number identification.

7. The apparatus according to claim 1 wherein the application is coupled to the host computer and receives the programming data sent by the host computer, the programming data operative to cause a telephone calls received from the telephone network to be directed to the agent group through an application vector selected by the host computer.

8. The apparatus according to claim 1 further including an intercept vector group operatively coupled to the routing vector, the intercept vector group configured to control routing of the telephone call upon detection of a fault condition.

9. The apparatus according to claim 8 wherein upon detection of a fault, the intercept vector causes the telephone call received from the telephone network to be coupled to a predetermined message.

10. The apparatus according to claim 9 wherein the predetermined message is at least one of a predetermined announcement and a predetermined tone.

11. A method for programming and communicating with an automatic call distributor, the method comprising the steps of:
    a) operatively coupling a control device to a telephone network;
    b) configuring the control device to receive incoming call data from the telephone network;
    c) coupling a host computer to the control device;
    d) configuring the host computer to receive script instructions according to a user;
    e) transmitting programming data from the host computer to the control device in accordance with the script instructions, the host computer providing a script editing facility having an interface in the form of a plurality of menus accessible to the user;
    f) coupling a routing vector between the host computer and the telephone network;
    g) configuring the routing vector to receive the programming data and to route telephone calls received from the telephone network in accordance with the received programming data;

h) operatively coupling an application to the routing vector;

i) configuring the application to receive telephone calls directed to the application by the routing vector;

j) operatively coupling an application vector to the application for selectively determining a routing path through which to direct the telephone calls received by the application;

k) operatively coupling an intercept vector between the routing vector and the application to direct the telephone call received by the routing vector to a predetermined application;

l) operatively coupling a plurality of telephone agent groups to the application through the application vector;

m) configuring the telephone agent groups to receive the telephone calls from the application via the application vector; and n) configuring the host computer to program the routing vector in accordance with the script instructions provided by the user.

12. The method according to claim 11 further including the steps of a) coupling the host computer to at least one of the routing vector and the application, and b) configuring the host computer to provide the programming data to at least one of the routing vector and the application in accordance with the script instructions provided to the host computer by the user, such that the telephone calls are routed to the agents along a route determined by at least one of the routing vector and the application.

13. The method according to claim 11 wherein the step of coupling the routing vector to the host computer facilitates the reception of programming data sent from the host computer such that the programming data received is operative to cause the telephone calls received from the telephone network to be directed to a selected agent group based upon identification information contained in the telephone call.

14. The method according to claim 13 wherein the identification information contained in the telephone call is at least one of a trunk group number, an internal directory number, a dialed number identification service, and an automatic number identification.

15. The method according to claim 11 further including the step of coupling the application to the host computer such that the application receives the programming data sent by the host computer, the programming data received operative to cause the telephone calls received from the telephone network to be directed to a selected agent group based upon identification information contained in the telephone call.

16. The method according to claim 15 wherein the identification information contained in the telephone call is at least one of a trunk group number, an internal directory number, a dialed number identification service, and an automatic number identification.

17. The method according to claim 11 wherein the step of coupling the application to the host computer facilitates reception of the programming data sent by the host computer, the programming data operative to cause a telephone calls received from the telephone network to be directed to the agent group through an application vector selected by the host computer.

18. The method according to claim 11 further including the steps of a) operatively coupling an intercept vector group to the routing vector; and b) configuring the intercept vector group to control routing of the telephone call upon detection of a fault condition.

19. The method according to claim 18 further including the steps of a) detecting a fault; and b) coupling the telephone call received from the telephone network to a predetermined message upon the detection of the fault, the intercept vector facilitating the coupling.

20. The method according to claim 19 wherein the predetermined message is at least one of a predetermined announcement and a predetermined tone.

21. An apparatus for programming and communicating with an automatic call distributor, the apparatus comprising:

a) means for controlling incoming call data from a telephone network;

b) means for receiving script instructions according to a user and configured to transmit programming data to the means for controlling incoming call data, in accordance with the script instructions;

c) the means for controlling incoming call data further including c.1) means for receiving the programming data and for routing telephone calls received from the telephone network in accordance with the received programming data, the means for receiving the programming data coupled to the means for receiving script instructions and to the telephone network;

c.2) means for receiving telephone calls sent from the means for receiving programming data, the means for receiving telephone calls operatively coupled to the means for receiving programming data;

c.3) means for selectively determining a routing path through which to direct the telephone calls, the means for selectively determining a routing path vector operatively coupled to the means for receiving telephone calls;

c.4) means for directing the telephone call received by the means for receiving the programming data, coupled between the means for receiving the programming data and the means for receiving telephone calls;

d) a plurality of telephone agent groups operatively coupled to the means for receiving telephone calls, the telephone agent groups configured to receive the telephone calls from the means for receiving telephone calls via the means for selectively determining a routing path; and e) the means for receiving script instructions configured to program the means for receiving the programming data in accordance with the script instructions provided by the user.

* * * * *